United States Patent
Won et al.

(10) Patent No.: US 7,632,591 B2
(45) Date of Patent: Dec. 15, 2009

(54) BRANCHED MULTIBLOCK POLYBENZIMIDAZOLE-BENZAMIDE COPOLYMER AND METHOD FOR PREPARING THE SAME, ELECTROLYTE MEMBRANE AND PASTE/GEL PREPARED THEREFROM

(75) Inventors: Jung-hye Won, Seoul (KR); Yong-su Park, Bucheon-si (KR); Chong-kyu Shin, Daejeon (KR); Jae-hyuk Chang, Daejeon (KR); Bong-keun Lee, Daejeon (KR); Dirk Henkensmeier, Daejeon (KR)

(73) Assignee: LG Chem, Ltd., Seoul (KR)

( * ) Notice: Subject to any disclaimer, the term of this patent is extended or adjusted under 35 U.S.C. 154(b) by 624 days.

(21) Appl. No.: 11/593,471

(22) Filed: Nov. 7, 2006

(65) Prior Publication Data

US 2007/0111075 A1    May 17, 2007

(30) Foreign Application Priority Data

Nov. 14, 2005    (KR) ...................... 10-2005-0108722

(51) Int. Cl.
  H01M 8/10    (2006.01)
(52) U.S. Cl. .......................... 429/33; 528/367; 528/423
(58) Field of Classification Search .................. 429/33; 528/367, 423
See application file for complete search history.

(56) References Cited

U.S. PATENT DOCUMENTS

2004/0096734 A1*    5/2004    Calundann et al. .......... 429/137

* cited by examiner

Primary Examiner—Jane Rhee
(74) Attorney, Agent, or Firm—McKenna Long & Aldridge LLP

(57) ABSTRACT

A branched multiblock polybenzimidazole-benzamide copolymer, specifically, one consisting of a repeating unit represented by Formula 1, and a method for preparing the same; an electrolyte membrane using the branched multiblock copolymer, a consistent electrolyte paste/gel and a method for preparing the same; a membrane-electrode assembly (MEA) using the electrolyte membrane and the consistent electrolyte paste/gel and a method for preparing the same; and a fuel cell prepared from the membrane-electrode assembly. The electrolyte membrane according to the present invention has high hydrogen ion conductivity over a wide temperature range, and excellent physical properties such as mechanical properties, chemical resistance and thermal stability. Deterioration of the membrane properties is effectively controlled by phosphoric acid doping and high hydrogen ion conductivity is realized even with a low phosphoric acid doping level. This consistent electrolyte paste/gel may be useful in improving the operating performance of a fuel cell by coating the electrolyte uniformly.

21 Claims, 3 Drawing Sheets

[FIG. 1]
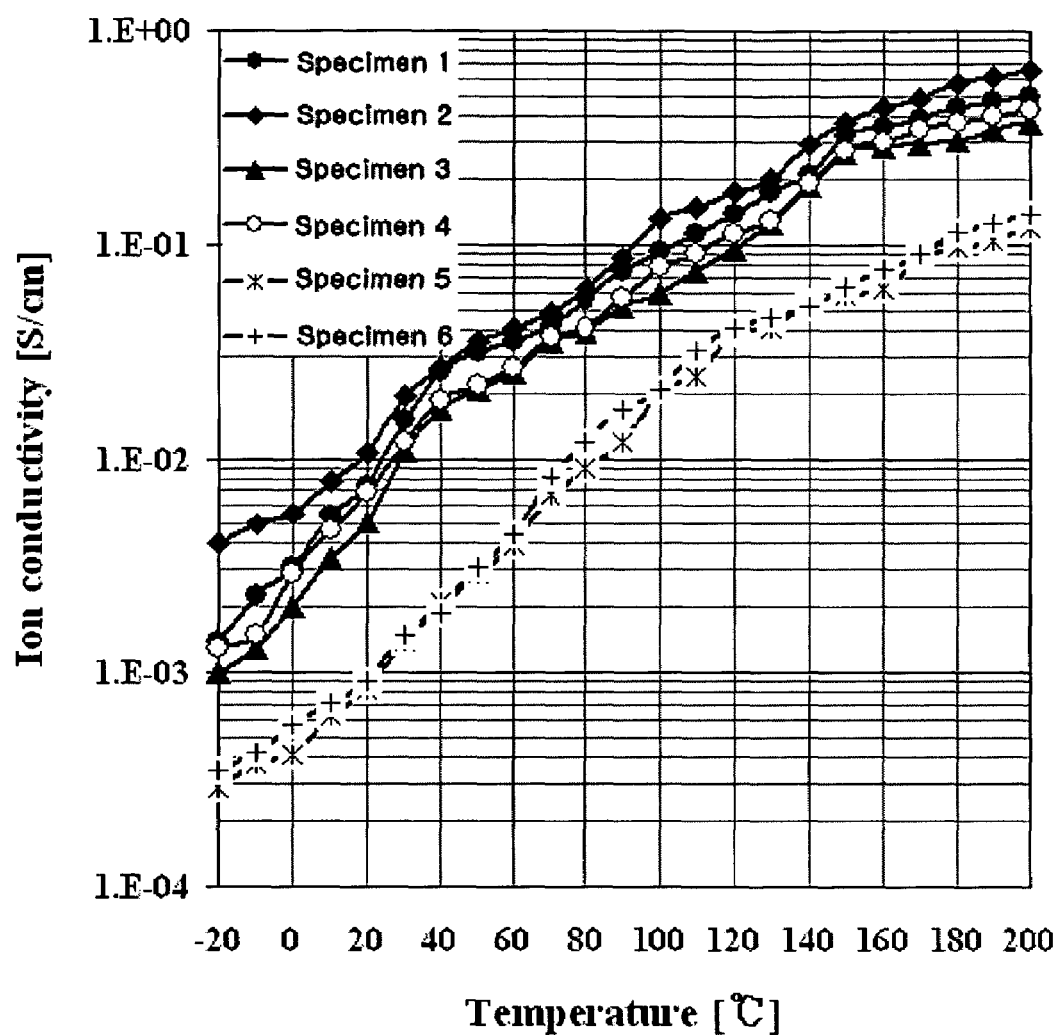

[FIG. 2]
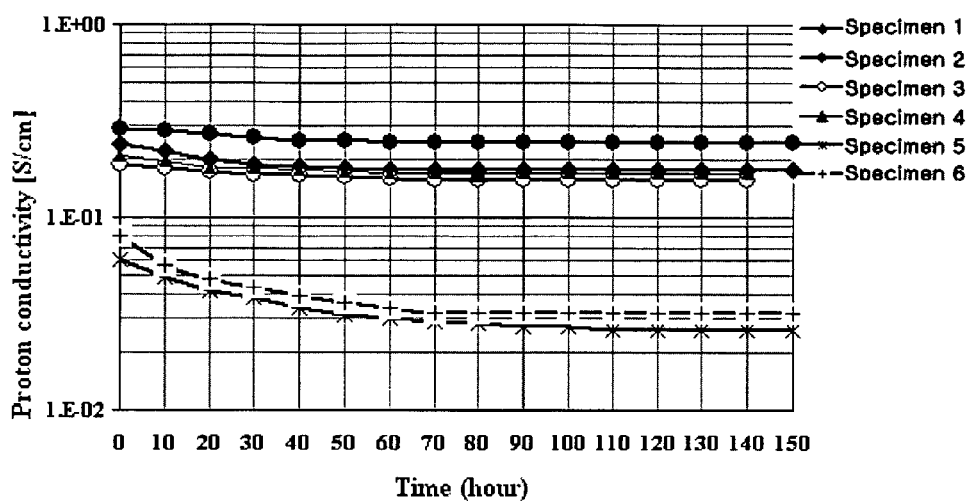
[FIG. 3]
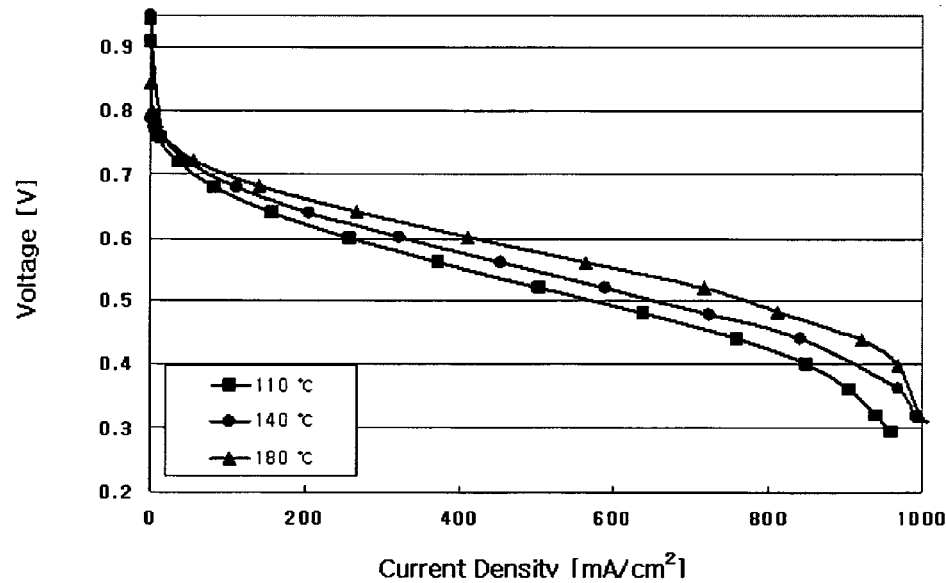

[FIG. 4]
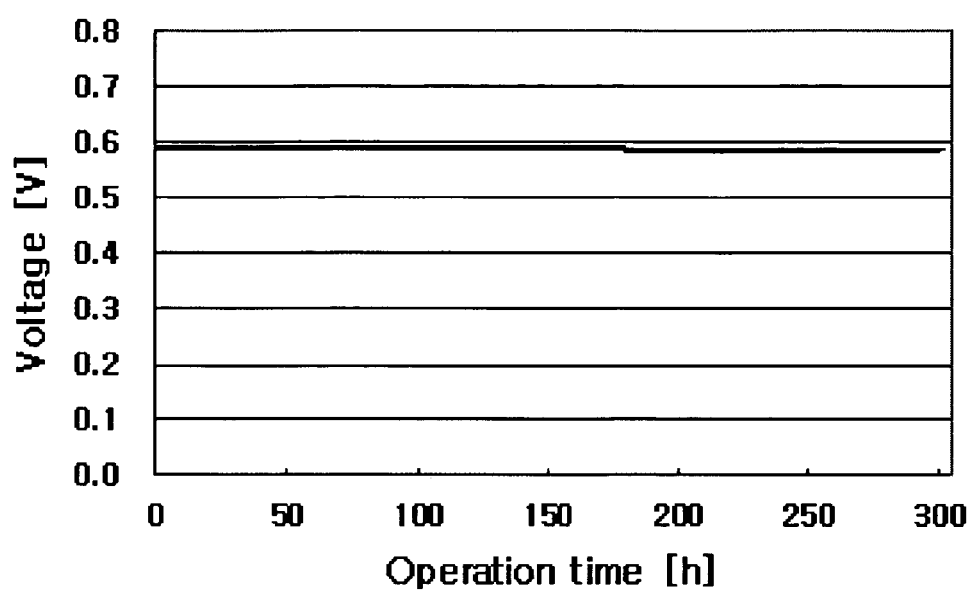

BRANCHED MULTIBLOCK POLYBENZIMIDAZOLE-BENZAMIDE COPOLYMER AND METHOD FOR PREPARING THE SAME, ELECTROLYTE MEMBRANE AND PASTE/GEL PREPARED THEREFROM

This application claims the benefit of the filing date of Korean Patent Application No. 10-2005-0108722 filed on Nov. 14, 2005 in the Korean Intellectual Property Office, the disclosure of which is incorporated herein in its entirety by reference.

TECHNICAL FIELD

The present invention relates to a branched multiblock polybenzimidazole-benzamide copolymer and a method for preparing the same, and more specifically, to a branched multiblock polybenzimidazole-benzamide copolymer consisting of a repeating unit represented by Formula 1 and a method for preparing the same, from which an electrolyte membrane and a consistent electrolyte paste/gel may be prepared, wherein the electrolyte membrane has the advantages of high hydrogen ion conductivity over a wide temperature range, as well as excellent physical properties such as mechanical properties, chemical resistance, and thermal stability. Deterioration of the membrane properties is effectively controlled by phosphoric acid doping and high hydrogen ion conductivity is realized even with a low phosphoric acid doping level. The consistent electrolyte paste/gel improves the driving performance of a fuel cell by coating the electrolyte membrane uniformly. The present invention also relates to a method for preparing an electrolyte membrane using the branched multiblock polybenzimidazole-benzamide copolymer; a consistent electrolyte paste/gel and a method for preparing the same; a membrane-electrode assembly (MEA) using the electrolyte membrane and the consistent electrolyte paste/gel; and a fuel cell prepared from the membrane-electrode assembly.

BACKGROUND ART

A fuel cell is an energy conversion apparatus that directly converts the chemical energy of a fuel to electrical energy. Therefore, there have been attempts to develop the fuel cell as a next-generation energy source due to its environmentally-friendly properties such as high-energy efficiency and low discharge of pollutants.

In the case of a moisture-free polymer electrolyte membrane fuel cell (PEMFC), it does not need a cooling apparatus since it may be operated over a wide temperature range, its sealing part is simple, it does not need a humidifier since moisture-free hydrogen is used as a fuel, and it has also been highlighted as a possible power supply in cars and households since it has an advantage of rapid operation, etc. Also, the moisture-free polymer electrolyte membrane fuel cell is a high-power fuel cell having a higher current density than other types of fuel cells, and therefore it has advantages in that it is operated over a wide temperature range, its structure is simple, and its operation and response are rapid.

A polyazole-based polybenzimidazole (®Celazole) is already known as a high-temperature fuel cell polymer electrolyte membrane. The fuel cell using the polybenzimidazole polymer electrolyte membrane generally uses moisture-free hydrogen as a fuel, and it does not need a cooling apparatus since it may be operated at 100° C. or more, especially 120° C. or more, its sealing part is simple, it does not need a humidifier, and activity of a noble metal-based catalyst present in a membrane-electrode assembly (MEA) may be enhanced. Generally, when hydrocarbon compounds such as natural gas are reformed and then used as a fuel, a catalyst is poisoned, which deteriorates a fuel cell seriously if carbon monoxide is not removed in a reformer gas workup or a purification process since a large amount of carbon monoxide is included in the reformer gas. In the case of the fuel cell using the polyazole-based polymer electrolyte membrane, a high density of carbon monoxide is allowable since the cell may be operated at a high temperature to minimize the catalyst poisoning by carbon monoxide.

The previously known polyazole-based polybenzimidazole (PBI) is generally melt-reacted with 3,3',4,4'-tetraaminobiphenyl and isophthalic acid, or esters thereof to prepare a primary polymer, and then the resultant primary polymer is ground and polymerized into a solid state at a high temperature (400° C. or less) to prepare a polybenzimidazole polymer. In order to prepare a polybenzimidazole membrane, the polybenzimidazole, generally polymerized into a solid state at a high temperature and a high pressure using a high-pressure reactor, is dissolved in a dimethylacetamide (DMAc) solution containing a small amount of lithium chloride (LiCl), and then a membrane is prepared according to the conventional method.

German Patent No. 10109824.4 discloses a method for removing dimethylacetamide from a membrane including a high content of dimethylacetamide prepared according to the conventional method after dissolving polybenzimidazole in a dimethylacetamide (DMAc) solution containing a small amount of lithium chloride (LiCl) at a high temperature and a high pressure using a high-pressure reactor. However, it is difficult to remove the remaining dimethylacetamide using the method described in the patent, and it is also troublesome since the workup process should be conducted after preparing the membrane. If a very small amount of dimethylacetamide remains in the membrane, then the method for preparing a polybenzimidazole membrane using a dimethylacetamide solvent is problematic by itself since activity of a noble metal-based catalyst is seriously reduced due to the remaining dimethylacetamide when operating the fuel cell.

U.S. Pat. No. 5,525,436 discloses a method for preparing an ion-conductive polybenzimidazole electrolyte membrane by doping a polybenzimidazole membrane, prepared according to the conventional method, with a strong acid such as phosphoric acid or sulfuric acid, etc. If a membrane is prepared after dissolving polybenzimidazole in a dimethylacetamide solution using the conventional method in a high-pressure reactor, then the prepared membrane has a high content of dimethylacetamide, and therefore the remaining dimethylacetamide should be removed. A post strong acid-doping process described in the patent is required for ion conductivity in prepared polybenzimidazole membrane, but a dense polybenzimidazole membrane prepared by a solution pouring process is not effective. Even though the post strong acid-doping process allows ion conductivity in the polybenzimidazole membrane, the ion conductivity does not exceed 0.1 S/cm at 140° C. in the absence of moisture. Because the morphology of the electrolyte membrane, induced into a highly dense polybenzimidazole membrane prepared previously by the post strong acid doping, is not optimized between the polybenzimidazole and the strong acid, the strong acid doped at the high temperature is easily detached from the electrolyte membrane, resulting in a sudden reduction of the ion conductivity for the operation time.

U.S. Pat. No. 5,945,233 discloses a method for preparing a polybenzimidazole consistent electrolyte paste/gel. However, it is inconvenient in the process to prepare a consistent electrolyte paste/gel by further adding phosphoric acid and water to polybenzimidazole (PBI) prepared according to the conventional method, followed by stirring the resulting mixture at a high temperature so as to prepare a consistent polybenzimidazole electrolyte paste/gel as described in the patent.

U.S. Patent Publication Nos. 2004/00127588A1 and 2005/0053820A1 disclose a process for preparing a polyazole-based ion conductive polymer electrolyte membrane prepared by a process consisting of five steps. According to the patent, the process for preparing a phosphoric acid-containing polyazole-based ion conductive polymer electrolyte membrane is disclosed, including the five steps of (a) preparing a primary polymer (a precursor), (b) dissolving the primary polymer in polyphosphoric acid, (c) preparing a polyazole-based polymer from the primary polymer, (d) forming a membrane on a support, and (e) treating the formed membrane until the membrane is supported by itself, and a process for preparing an electrode coated with a polyazole-based polymer film by directly coating the electrode with the polyazole-based polymer prepared in the step (c). However, the method described in the patent has difficult steps in the process such as preparing a primary polymer (a precursor) at a high temperature, dissolving the primary polymer in polyphosphoric acid again, and then preparing a polyazole-based polymer from the primary polymer at a high temperature. In addition, the patent discloses a process for preparing an electrode coated with a polyazole-based polymer film by directly coating an electrode with polyazole-based polymer containing the polyphosphoric acid prepared in the step (c), but it has problems in that it is difficult to uniformly coat an electrode due to the very high viscosity of the polyazole-based polymer, and a workup process to hydrolyze the coated polyphosphoric acid is required for producing ion conductivity in the coated electrode.

DISCLOSURE OF INVENTION

The present invention is designed to solve the problems occurring in the prior art, and therefore it is an object of the present invention to provide a branched multiblock polybenzimidazole-benzamide copolymer consisting of a repeating unit represented by Formula 1 and a method of preparing the same, from which an electrolyte membrane and a consistent electrolyte paste/gel may be prepared, wherein the electrolyte membrane has the advantages of high hydrogen ion conductivity over a wide temperature range, as well as excellent physical properties such as mechanical properties, chemical resistance, and thermal stability. Deterioration of the membrane properties is effectively controlled by phosphoric acid doping and high hydrogen ion conductivity is realized even with a low phosphoric acid doping level. The consistent electrolyte paste/gel improves the operating performance of a fuel cell by coating the electrolyte membrane uniformly.

It is another object of the present invention to provide an electrolyte membrane using the branched multiblock polybenzimidazole-benzamide copolymer and a consistent electrolyte paste/gel; and a method for preparing the same.

It is still another object of the present invention to provide a membrane-electrode assembly (MEA) using the electrolyte membrane and the consistent electrolyte paste/gel; and a method for preparing the same.

It is also another object of the present invention to provide a fuel cell using the membrane-electrode assembly.

These and other objects of the present invention may all be realized referring to the preferred embodiments, as follows.

In order to accomplish the objects, the present invention provides a branched multiblock polybenzimidazole-benzamide copolymer consisting of a repeating unit represented by the following Formula 1:

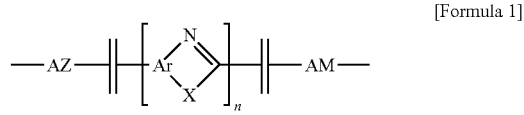

[Formula 1]

wherein,

AZ represents at least one repeating unit selected from the group consisting of Formulas 2 and 3;

AM represents at least one repeating unit selected from the group consisting of Formulas 4, 5, 6 and 7:

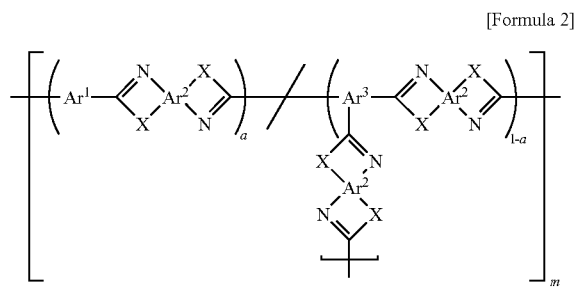

[Formula 2]

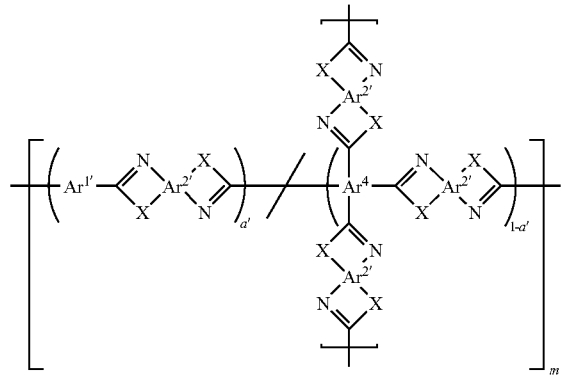

[Formula 3]

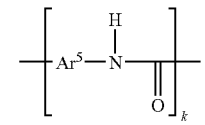

[Formula 4]

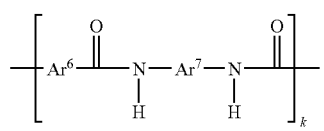

[Formula 5]

-continued

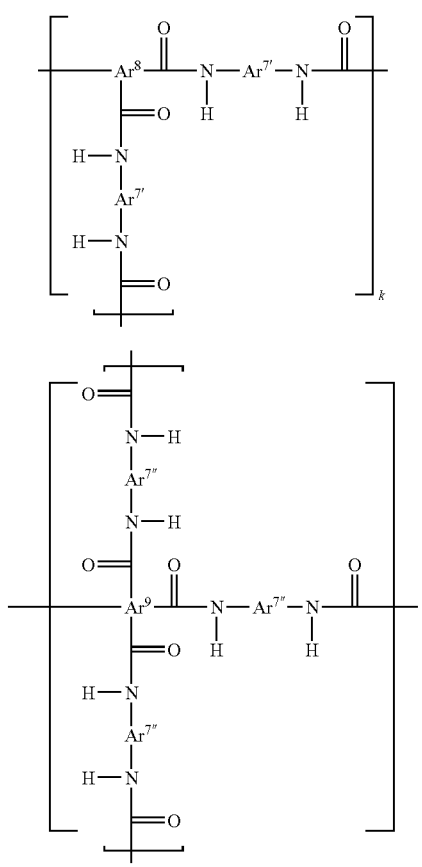

[Formula 6]

[Formula 7]

wherein,

Ar, $Ar^2$, $Ar^{2'}$ and $Ar^9$ are independently identical or different to each other, each representing a tetravalent aromatic or heteroaromatic group having at least one ring;

$Ar^1, Ar^{1'}, Ar^5, Ar^6, Ar^7$ and $Ar^{7''}$ are independently identical or different to each other, each representing a divalent aromatic or heteroaromatic group having at least one ring;

$Ar^3, Ar^{4'}$ and $Ar^8$ are independently identical or different to each other, each representing a trivalent aromatic or heteroaromatic group having at least one ring;

X is identical or different to each other, each representing a group having an oxygen, sulfur or hydrogen atom, a group having 1 to 20 carbon atoms, or an aryl group;

$0 < a < 1$, and $0 < a' < 1$; and $1 \leq m < 10,000$, $1 \leq n < 10,000$, and $1 \leq k < 10,000$.

The present invention also provides a method for preparing the multiblock polybenzimidazole-benzamide copolymer, wherein a compound is dissolved in polyphosphoric acid in the presence of inert gas and polymerized at a temperature of 300° C. or less, the compound being selected from the group consisting of: at least one compound selected from the group consisting of the aromatic and heteroaromatic tetraamino compounds; at least one compound selected from the group consisting of aromatic and heteroaromatic carboxylic acids having at least two acid groups per carboxylic acid monomer, and their esters; at least one compound selected from the group consisting of aromatic and heteroaromatic diaminocarboxylic acids; at least one compound selected from the group consisting of aromatic and heteroaromatic aminocarboxylic acids and aromatic and heteroaromatic diamino compounds; and at least one compound selected from the group consisting of aromatic and heteroaromatic tricarboxylic acids and tetracarboxylic acids.

The present invention also provides an electrolyte membrane prepared from the branched multiblock polybenzimidazole-benzamide copolymer solution.

The present invention also provides a method for preparing an electrolyte membrane, wherein the copolymer electrolyte membrane is prepared by directly coating the branched multiblock polybenzimidazole-benzamide copolymer solution on a support, followed by inducing hydrolysis of a polyphosphoric acid solvent until a membrane is formed from the coated solution.

The present invention also provides a consistent electrolyte paste/gel prepared from the branched multiblock polybenzimidazole-benzamide copolymer solution.

The present invention also provides a method for preparing a consistent electrolyte paste/gel, wherein the copolymer is prepared by adding a small amount of water to the branched multiblock polybenzimidazole-benzamide copolymer solution to induce hydrolysis of a polyphosphoric acid.

The present invention also provides a membrane-electrode assembly prepared from the electrolyte membrane and the consistent electrolyte paste/gel; and a method for preparing the same.

The present invention also provides a fuel cell prepared from the membrane-electrode assembly.

The novel branched multiblock polybenzimidazole-benzamide copolymer obtained according to the present invention may be prepared with a preparation method whereby the difficulty in the process is solved by directly preparing a polyazole-amide-based polymer from the monomer, for example in one integral step of (a) preparing a primary polymer (a precursor); (b) dissolving the primary polymer in polyphosphoric acid and (c) preparing a polyazole-based polymer from the primary polymer, as described in the U.S. Patent Publication Nos. 2004/00127588A1 and 2005/0053820A1.

Also, difficulty in the process may be eliminated by adding only a small amount of water to the polyphosphoric acid-containing polyazole-amide-based polymer prepared from the monomer in the first step and inducing hydrolysis of polyphosphoric acid to prepare a consistent electrolyte paste/gel without further adding phosphoric acid and water to polybenzimidazole (PBI) prepared according to the conventional method as described in the U.S. Pat. No. 5,945,233.

The novel branched multiblock polybenzimidazole-benzamide copolymer electrolyte membrane prepared according to the present invention exhibits high ion conductivity over a wide temperature range of −20 to 200° C. under moisture-free conditions, and the consistent electrolyte paste/gel can provide a fuel cell having excellent performance by uniformly coating an electrode.

Hereinafter, the present invention will be described in detail.

The branched multiblock polybenzimidazole-benzamide copolymer of the present invention is characterized in that it consists of a repeating unit represented by Formula 1.

The branched multiblock polybenzimidazole-benzamide copolymer may be prepared by dissolving a compound in polyphosphoric acid in the presence of inert gas and being directly polymerized from the monomer at a temperature of 300° C. or less, the compound being selected from the group consisting of: at least one compound selected from the group consisting of the aromatic and heteroaromatic tetraamino compounds; at least one compound selected from the group consisting of aromatic and heteroaromatic carboxylic acids having at least two acid groups per carboxylic acid monomer, and their esters; at least one compound selected from the group consisting of aromatic and heteroaromatic diaminocarboxylic acids; at least one compound selected from the group consisting of aromatic and heteroaromatic aminocarboxylic acids and aromatic and heteroaromatic diamino compounds; and at least one compound selected from the group consisting of aromatic and heteroaromatic tricarboxylic acids and tetracarboxylic acids.

The method for preparing the branched multiblock polybenzimidazole-benzamide copolymer is a preparation method (A) including steps of:

(a) firstly preparing an azole-based AZ block using at least one compound as a branching agent in addition to the aromatic and heteroaromatic tetraamino compounds and the aromatic and heteroaromatic carboxylic acids, wherein the compound is selected from the group consisting of aromatic and heteroaromatic tricarboxylic acids and tetracarboxylic acids;

(b) preparing a copolymer

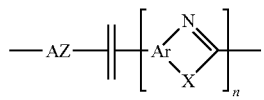

in which the branched AZ block and a

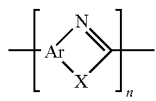

block are chemically combined alternately by adding aromatic and heteroaromatic diaminocarboxylic acid after dissolving a compound constituting the AZ block in polyphosphoric acid in the presence of inert gas and stirring the resultant mixture; and (c) preparing a branched multiblock copolymer consisting of a repeating unit represented in the Formula 1 by adding to a

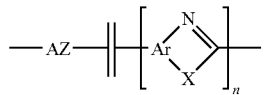

block copolymer solution at least one compound selected from the group consisting of aromatic and heteroaromatic aminocarboxylic acids and aromatic and heteroaromatic diamino compounds; at least one compound selected from the group consisting of aromatic and heteroaromatic carboxylic acids; and aromatic and heteroaromatic tricarboxylic acids and tetracarboxylic acids, etc., after adding the aromatic and heteroaromatic diaminocarboxylic acid to the copolymer solution and stirring the resultant mixture.

In the preparation method (A), it is preferable to prepare the azole-based AZ block at first.

In step (a), the branching agent may be used at a content of 0.01 to 30 mol %, preferably 0.01 to 10 mol %, based on the total content of the tetraamino compound used in preparing the branched AZ block.

In step (b), compounds constituting the AZ block may be dissolved in polyphosphoric acid in the presence of inert gas and stirred at 300° C. or less, preferably 220° C. or less, for 8 hours or less, preferably 5 hours or less.

In step (b), the aromatic and heteroaromatic diaminocarboxylic acid may be used at a content of 0.01 to 99.99 mol %, preferably 5 to 50 mol %, based on the total content of the tetraamino compound constituting the AZ block.

In step (c), the aromatic and heteroaromatic diaminocarboxylic acid may be added and stirred for 48 hours or less, and preferably 24 hours or less.

In step (c), the compound selected from the group consisting of aromatic and heteroaromatic aminocarboxylic acids and aromatic and heteroaromatic diamino compounds; the compound selected from the group consisting of aromatic and heteroaromatic carboxylic acids; and the aromatic and heteroaromatic tricarboxylic acids and tetracarboxylic acids may be used at a content of 0.01 to 49.99 mol %, preferably 0.5 to 20 mol %, based on the total content of the tetraamino compound constituting the AZ block.

Also, the method for preparing the branched multiblock polybenzimidazole-benzamide copolymer may be a preparation method (B) including the steps of:

(a') firstly preparing a

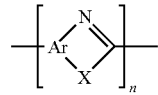

block by dissolving an aromatic and heteroaromatic diaminocarboxylic acid in polyphosphoric acid in the presence of inert gas;

(b') preparing a multiblock copolymer consisting of a repeating unit

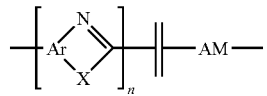

by adding at least one compound selected from the group consisting of aromatic and heteroaromatic aminocarboxylic acids and aromatic and heteroaromatic diamino compounds; at least one compound selected from the group consisting of aromatic and heteroaromatic carboxylic acids; and aromatic and heteroaromatic tricarboxylic acids and tetracarboxylic acids, etc.; and (c') preparing a branched multiblock copolymer consisting of a repeating unit represented by the Formula 1 using the aromatic and heteroaromatic tricarboxylic acid and tetracarboxylic acid as a branching agent in addition to the aromatic and heteroaromatic tetraamino compound and the aromatic and heteroaromatic carboxylic acid.

In step (a'), the aromatic and heteroaromatic diaminocarboxylic acid may be dissolved in polyphosphoric acid in the presence of inert gas, and stirred at 300° C. or less, but preferably 220° C. or less, for 8 hours or less, preferably 5 hours or less.

In step (b'), at least one compound selected from the group consisting of aromatic and heteroaromatic aminocarboxylic acids and aromatic and heteroaromatic diamino compounds; at least one compound selected from the group consisting of aromatic and heteroaromatic carboxylic acids; and the aromatic and heteroaromatic tricarboxylic acids and tetracarboxylic acids may be used at a content of 0.01 to 99.99 mol %, preferably 5 to 50 mol %, based on the total content of the aromatic and heteroaromatic diaminocarboxylic acid compound constituting the

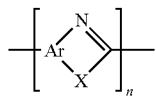

block.

In step (b'), the aromatic and heteroaromatic diaminocarboxylic acid may be added and stirred at 220° C. or less for 48 hours or less, and preferably 24 hours or less.

In step (c'), the aromatic and heteroaromatic tetraamino compound, the aromatic and heteroaromatic carboxylic acid, and the aromatic and heteroaromatic tricarboxylic acid and tetracarboxylic acid may be used at a content of 10 to 1000 mol %, preferably 50 to 500 mol %, based on the total content of the aromatic and heteroaromatic diaminocarboxylic acid compound constituting the

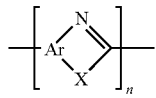

block.

In step (c'), the aromatic and heteroaromatic diaminocarboxylic acid may be added and stirred at 220° C. or less for 48 hours or less, and preferably 24 hours or less.

The aromatic and heteroaromatic tetraamino compounds used in the preparation method of the present invention are selected from the group consisting of 3,3',4,4'-tetraaminobiphenyl, 2,3,5,6-tetraaminopyridin, 1,2,4,5-tetraaminobenzene, bis(3,4-diaminophenyl)sulfone, bis(3,4-diaminophenyl)ether, 3,3',4,4'-tetraaminobenzophenone, 3,3',4,4'-tetraaminodiphenylmethane and 3,3',4,4'-tetraaminodiphenyldimethylmethane, salts thereof, especially mono-, di-, tri- and tetrahydrochloride derivatives thereof, and they may be used alone or in combinations thereof.

The used aromatic carboxylic acid may be dicarboxylic acid and its esters, anhydrides or acid chlorides, etc. The aromatic dicarboxylic acid is selected from the group consisting of 2,3-bis(4-carboxylphenyl)quinoxalin, 1,4-phenylene-bis-[3-(4'-carboxylphenyl)thiourea], p-phenylene-2,2'-bis[5(6)-carboxylbenzimidazole], bis(4-carboxylphenyl)phosphinic acid, bis(4-carboxylphenyl)phenylmethanol, bis(4-carboxylphenyl)phenylphosphine oxide, 5-phosphinoisophthalic acid, isophthalic acid, terephthalic acid, phthalic acid, 5-hydroxyisophthalic acid, 4-hydroxyisophthalic acid, 2-hydroxyisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis (4-carboxyphenyl) ether, benzophenone-4,4'-dicarboxylic acid, bis(4-carboxyphenyl)sulfone, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid; $C_1$-$C_{20}$-alkylesters or $C_5$-$C_{12}$-arylesters thereof; and acid anhydrides or acid chlorides thereof, etc., and they may be used alone or in combinations thereof.

The heteroaromatic carboxylic acid is heteroaromatic dicarboxylic acid or esters or anhydrides thereof which is a system containing at least one nitrogen, oxygen, sulfur or phosphorous atom in the aromatics, and it is selected from the group consisting of pyridin-2,5-dicarboxylic acid, pyridin-3,5-dicarboxylic acid, pyridin-2,6-dicarboxylic acid, pyridin-2,4-dicarboxylic acid, 4-phenyl-2,5-pyridindicarboxylic acid, 3,5-pyrazoldicarboxylic acid, 2,6-pyrimidinedicarboxylic acid, 2,5-pyrimidinedicarboxylic acid, benzimidazole-5,6-dicarboxylic acid; $C_1$-$C_{20}$-alkylesters or $C_5$-$C_{12}$-arylesters thereof; acid anhydrides or acid chlorides thereof, etc., and they may be used alone or in combinations thereof.

The used aromatic and heteroaromatic diaminocarboxylic acid may be 3,4-diaminobenzoic acid, and mono- or dihydrochloride derivatives thereof, etc.

The aromatic and heteroaromatic aminocarboxylic acid is selected from the group consisting of 4-aminobenzoic acid, 3-aminobenzoic acid, 4-amino-2-sulfobenzoic acid, 4-amino-3-sulfobenzoic acid, 4-amino-2-sulfobenzoic acid, 2-aminopyrimidine-5-carboxylic acid, 6-aminopyridin-3-carboxylic acid, 5-aminopyridin-2-carboxylic acid, 5-aminopyrazine-2-carboxylic acid, 5-aminopyrimidine-2-carboxylic acid, 2-(phenyl)-p-aminobenzoic acid, and 3-(phenyl)-p-aminobenzoic acid, etc., and they may be used alone or in combinations thereof.

The aromatic and heteroaromatic diamino compound is selected from the group consisting of benzene-1,4-diamine, 2,5-diaminobenzenesulfonic acid, pyrazine-2,5-diamine, pyridin-2,5-diamine, 2-(phenyl)benzene-1,4-diamine, pyrimidine-2,5-diamine, 2-(pyridin-3-yl)benzene-1,4-diamine, 2-(pyridin-2-yl)benzene-1,4-diamine, 2-(pyridin-2-yl)benzene-1,4-diamine, 2-(pyridin-5-yl)benzene-1,4-diamine, 4,4'-diaminobiphenyl, 3,3'-diaminobiphenyl, 3,4'-diaminobiphenyl, 5-amino-2-(p-aminophenyl)benzenesulfonic acid, 2-amino-5-(p-aminophenyl)benzenesulfonic acid, and 4,4'-diamino-2-phenylbiphenyl, etc., and they may be used alone or in combinations thereof.

The used branching agent may be aromatic and heteroaromatic tricarboxylic acid and tetracarboxylic acid, and esters, anhydrides or acid chlorides thereof, etc.

The aromatic tricarboxylic acids used as the branching agent; the $C_1$-$C_{20}$-alkylesters or $C_5$-$C_{12}$-arylesters thereof; the acid anhydrides or acid chlorides thereof are selected from the group consisting of 1,3,5-benzenetricarboxylic acid(trimesic acid), 1,2,4-benzenetricarboxylic acid(trimellitic acid), 3,5,3'-biphenyltricarboxylic acid, and 3,5,4'-biphenyltricarboxylic acid, etc., and they may be used alone or in combinations thereof.

The aromatic tetracarboxylic acid or tetracarboxylic acid used as the branching agent; the $C_1$-$C_{20}$-alkylesters or $C_5$-$C_{12}$-arylesters thereof; the acid anhydrides or acid chlorides thereof are selected from the group consisting of 3,5,3',5'-biphenyltetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, and 1,4,5,8-naphthalenetetracarboxylic acid, etc., and they may be used alone or in combinations thereof.

The heteroaromatic tricarboxylic acid and tetracarboxylic acid used as the branching agent; the $C_1$-$C_{20}$-alkylesters or $C_5$-$C_{12}$-arylesters thereof; and the acid anhydrides thereof may be 2,4,6-pyridintricarboxylic acid.

The branched multiblock copolymer preferably has at least 10, and more preferably at least 100 repeating units of the azole-based AZ. Also, it preferably has at least one, and more preferably at least 10 repeating units of the amide-based AM.

A branched multiblock copolymer containing a benzimidazole-benzamide repeating unit is preferred so as to accomplish the objects of the present invention, and the branched multiblock copolymers containing a repeating unit of benzimidazole-benzamide is, for example, represented by the following Formula 8.

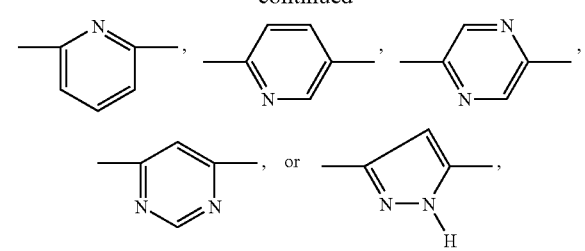

[Formula 8]

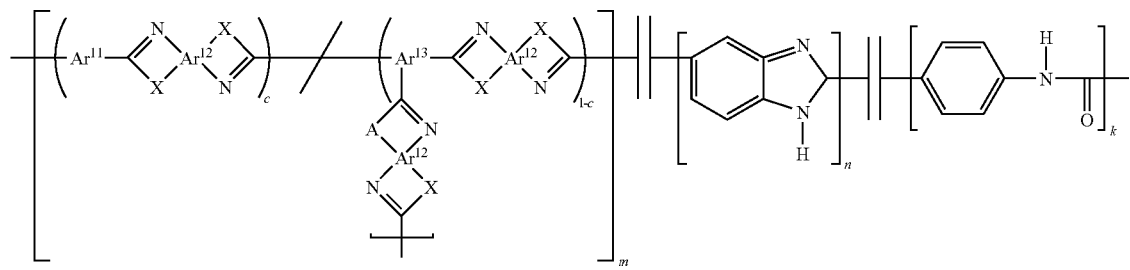

wherein, $Ar^{11}$ is selected from the group consisting of

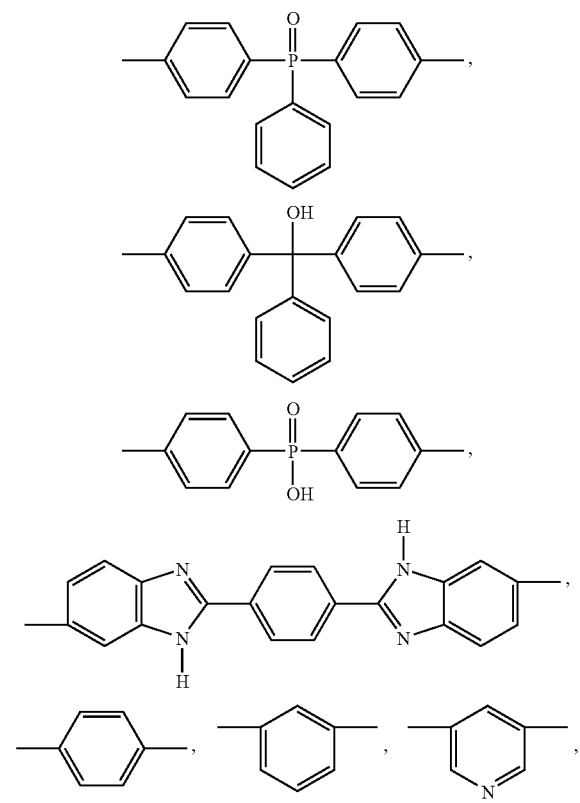

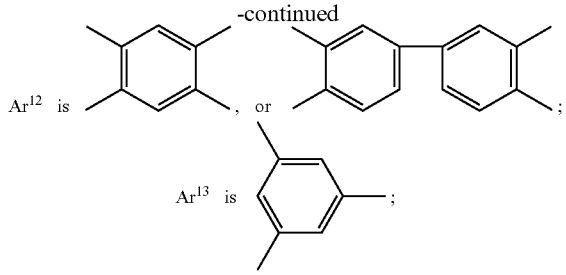

$Ar^{12}$ is $Ar^{13}$ is $0 < c < 1$; and
$1 \leq m < 10,000$, $1 \leq n < 10,000$, and $1 \leq k < 10,000$.

The multiblock polybenzimnidazole-benzamide copolymer of the present invention has a high molecular weight, and its measured intrinsic viscosity is much higher, at 3.4 dl/g or less, than that of the commercially available polybenzimidazole. This is considered to be an effect contributing to the branching agent used in preparing the copolymer, namely tricarboxylic acid or tetracarboxylic acid, and an intrinsic property in which the copolymer consists of a repeating unit of benzimidazole-benzamide.

In the present invention, an electrolyte membrane may be prepared from the prepared multiblock polybenzimidazole-benzamide copolymer.

The electrolyte membrane may be prepared by a coating method, for example by directly coating the prepared polyphosphoric acid-containing multiblock polybenzimidazole-benzamide copolymer solution as defined in claim 1 on a support, preferably on a hydrophilic-treated support, followed by inducing hydrolysis of a polyphosphoric acid solvent until a membrane is formed from the coated solution.

In the present invention, a consistent electrolyte paste/gel may be prepared from the prepared multiblock polybenzimidazole-benzamide copolymer.

The consistent electrolyte paste/gel may be prepared by adding a small amount of water to the prepared polyphosphoric acid-containing multiblock polybenzimidazole-benzamide copolymer solution and stirring the resultant mixture to remove the remaining water while inducing hydrolysis of a polyphosphoric acid.

The added water may be used at a content of 100 to 1,000 mol %, and preferably 100 to 200 mol %, based on the total content of the polyphosphoric acid.

The stirring time is 48 hours or less, and preferably 24 hours or less at a temperature of 100 to 150° C.

The prepared consistent electrolyte paste/gel has 50 to 200% by weight, and preferably about 100% by weight, of the phosphoric acid.

The membrane-electrode assembly of the present invention may be prepared by a simple method, having improved performance, by coating an electrolyte membrane with an electrode containing the consistent electrolyte paste/gel and the noble metal-based catalyst upon applying it to the fuel cell.

The method of the present invention can create a fuel cell using the prepared membrane-electrode assembly.

BRIEF DESCRIPTION OF THE DRAWINGS

FIG. 1 is a diagram showing hydrogen-ion conductivity according to the temperature of a branched multiblock polybenzimidazole-benzamide copolymer electrolyte membrane prepared as one embodiment of the present invention;

FIG. 2 is a diagram showing hydrogen-ion conductivity according to the time of a branched multiblock polybenzimidazole-benzamide copolymer electrolyte membrane prepared as one embodiment of the present invention at 140° C.;

FIG. 3 is a diagram showing the performance of a PEM fuel cell according to the operating temperature in a branched multiblock polybenzimidazole-benzamide copolymer electrolyte membrane (specimen 2) prepared as one embodiment of the present invention; and FIG. 4 is a diagram showing the performance of a PEM fuel cell according to the time in a branched multiblock polybenzimidazole-benzamide copolymer electrolyte membrane (specimen 2) prepared as one embodiment of the present invention at 160° C. and 300 mA/cm$^2$.

BEST MODES FOR CARRYING OUT THE INVENTION

Hereinafter, preferred embodiments of the present invention will be described in detail with reference to the accompanying drawings. Therefore, the description proposed herein is just a preferable example for the purpose of illustration only, and is not intended to limit the scope of the invention.

EXAMPLE

Example 1

Preparation of branched multiblock polybenzimidazole-benzamide copolymer [branched multiblock poly(2,2'-p-(phenylene)-5,5'-bibenzimidazole)-//-poly(2,5-benzimidazole)-//-poly(p-benzamide)] (80-15-5% by weight) (1)

Dicarboxylic acid and 3,3',4,4'-tetraaminobiphenyl used for polymerization were dried at 80° C. for at least 24 hours in a vacuum, and 3,4-diaminobenzoic acid was purified from distilled water by recrystallization. That is, 5 g of 3,4-diaminobenzoic acid was added to 100 mL of distilled water and heated to dissolve all the components, and then an aqueous 3,4-diaminobenzoic acid solution was slowly cooled to obtain a brown needle-shaped crystal. The 3,4-diaminobenzoic acid thus purified was dried at 80° C. for at least 24 hours in a vacuum, and then used in preparing a polymer. The solvent used for polymerization is polyphosphoric acid ($P_2O_5$: 85%, $H_3PO_4$: 15%), kindly provided by the company JUNSEI.

80 g of polyphosphoric acid was added to a nitrogen atmosphere reactor equipped with a stirrer, and then the temperature was increased to 170° C. to facilitate mixing of polyphosphoric acid. 2.000 g of 3,3',4,4'-tetraaminobiphenyl (9.334 mmol), 1.527 g of terephthalic acid (9.194 mmol), and 0.019 g of 1,3,5-benzenetricarboxylic acid (0.093 mmol) were then added to polyphosphoric acid and stirred for 3 hours, and then 0.710 g of 3,4-diaminobenzoic acid (4.667 mmol) was added to a polymer reaction solution and further stirred for 18 hours. Finally, 0.224 g of 4-aminobenzoic acid (1.633 mmol) was added to a polymer reaction solution and further stirred for 24 hours to prepare a branched multiblockpolyazole-amide (80-15-5 wt %) copolymer 1 having a very high viscosity.

Example 2

Preparation of branched multiblock polybenzimidazole-benzamide copolymer [branched multiblock poly(2,2'-p-(phenylene)-5,5'-bibenzimidazole)-//-poly(2,5-benzimidazole)-//-poly(p-benzamide)] (84-11-5 wt %) (2)

This was repeated in the same manner as in Example 1, except that 80 g of polyphosphoric acid, 2.000 g of 3,3',4,4'-tetraaminobiphenyl (9.334 mmol), 1.527 g of terephthalic acid (9.194 mmol), 0.019 g of 1,3,5-benzenetricarboxylic acid (0.093 mmol), 0.473 g of 3,4-diaminobenzoic acid (3.111 mmol), and 0.211 g of 4-aminobenzoic acid (1.542 mmol) were used to prepare a copolymer 2.

Example 3

Preparation of branched multiblock polybenzimidazole-benzamide copolymer [branched multiblock poly(2,2'-m-(phenylene)-5,5'-bibenzimidazole)-//-poly(2,5-benzimidazole)-//-poly(p-benzamide)] (80-15-5 wt %) (3)

This was repeated in the same manner as in Example 1, except that 80 g of polyphosphoric acid, 2.000 g of 3,3',4,4'-tetraaminobiphenyl (9.334 mmol), 1.527 g of isophthalic acid (9.194 mmol), 0.019 g of 1,3,5-benzenetricarboxylic acid (0.093 mmol), 0.710 g of 3,4-diaminobenzoic acid (4.667 mmol), and 0.224 g of 4-aminobenzoic acid (1.633 mmol) were used to prepare a copolymer 3.

Example 4

Preparation of branched multiblock polybenzimidazole-benzamide copolymer [branched multiblock poly(2,2'-(4,4'-triphenylphosphineoxide)-5,5'-bibenzimidazole)-poly(2,5-benzimidazole)-poly(p-benzamide)] (85-11-4 wt %) (4)

This was repeated in the same manner as in Example 1, except that 80 g of polyphosphoric acid, 2.000 g of 3,3',4,4'-tetraaminobiphenyl (9.334 mmol), 3.368 g of bis(4-carboxylphenyl)phenylphosphine oxide (9.194 mmol), 0.019 g of 1,3,5-benzenetricarboxylic acid (0.093 mmol), 0.710 g of 3,4-diaminobenzoic acid (4.667 mmol), and 0.224 g of 4-aminobenzoic acid (1.633 mmol) were used to prepare a copolymer 4.

Examples 5 to 8

Preparation of Polybenzimidazole-Benzamide Copolymer Electrolyte Membrane Specimens 80 g of polyphosphoric acid and phosphoric acid was further added to the solutions of branched multiblock polybenzimidazole-benzamide copolymer 1 to 4 prepared in Examples 1 to 4 having a very high viscosity, and stirred for 24 hours to reduce the viscosity of the solutions. A Pyrex glass sheet used as a doctor blade and a support was heated to about 200° C. before a film was prepared with a direct solution pouring method. The resultant polymerization solution was poured into the heated support, and coated at a constant thickness using the heated doctor blade. The coated glass sheet was kept at 80° C. for 2 hours in a thermo-hygrostat maintained horizontally to allow the solution to spread widely, and then humidified at a relative humidity of 40% to induce hydrolysis of polyphosphoric acid. The temperature was slowly cooled over about 2 to 3 days, and an excess of phosphoric acid and water induced by hydrolysis of polyphosphoric acid was removed at any time while increasing the relative humidity and then maintaining a temperature of 40° C. and a relative humidity of 80%. Finally, the formed membrane was separated from the support to prepare phosphoric acid containing polybenzimidazole-benzamide copolymer electrolyte membranes specimens 1 to 4.

Examples 9 to 12

Preparation of Consistent Paste/Gel of Polybenzimidazole-Benzamide 360 g of polyphosphoric acid and phosphoric acid was added to the solutions of branched multiblock polybenzimidazole-benzamide copolymer 1 to 4 prepared in Examples 1 to 4, and stirred at 200° C. for 24 hours to reduce the viscosity of the solution of the copolymer 1 having a very high viscosity. The temperature of the solution of the copolymer 1 was reduced to 150° C., and 80 g of water was slowly added to prepare consistent paste/gels 1 to 4 by stirring the resultant mixture to remove the remaining water until the consistent paste/gels were prepared while inducing hydrolysis of a polyphosphoric acid. The prepared consistent paste/gels contain about 99% by weight of phosphoric acid.

Examples 13 to 16

Preparation of Membrane-Electrode Assembly from Electrolyte Membrane

Each of the polybenzimidazole-benzamide copolymer electrolyte membranes specimens 1 to 4 prepared in Examples 5 to 8 were used herein. A 5-layered membrane-electrode assembly (MEA) was prepared using the prepared electrolyte membrane having a thickness of approximately 100 μm. Both the cathode and anode were loaded at an amount of 0.5 mg Pt/cm$^2$, the electrode had a size of 5×5 cm$^2$, and the electrolyte membrane had a size of 10×10 cm$^2$. The catalyst electrode was prepared using PTFE (polytetrafluoroethylene) as a binder. In order to prepare a catalyst slurry which is uniformly dispersed without any coagulation of slurry, IPA (isopropylalcohol), PTFE (60 wt % dispersion in water), water and a catalyst were mixed at a suitable amount to prepare a slurry, and then dispersed into small particles by means of an ultrasonic grinding procedure for 5 minutes. GDL (Gas Diffusion Layer) was coated with a constant amount of the prepared electrode slurry using a brush, and heated at 350° C. for 30 minutes. Also, each of the prepared electrodes was further coated with the polybenzimidazole-benzamide copolymer consistent electrolyte paste/gels 1 to 4 prepared in Examples 9 to 12, respectively, to penetrate a polybenzimidazole-benzamide polymer between catalyst layers.

The high-temperature and pressure conditions of the electrolyte membrane specimen and the GDE (Gas Diffusion Electrode) are listed as follows: The temperature of a high-temperature press was increased to 140° C., and then maintained at 0.1 ton for 5 minutes to transfer the heat sufficiently. The press was then maintained at 1.0 ton for 2 minutes, and the electrolyte membrane and the GDE were adhered to each other.

Comparative Example 1

Preparation of polyparabenzimidazole copolymer [Poly(2,2-p-(phenylene)-5,5-bibenzimidazole)] (5)

This was repeated in the same manner as in Example 1, except that 80 g of polyphosphoric acid, 3.000 g of 3,3',4,4'-tetraaminobiphenyl (9.334 mmol), and 2.326 g of terephthalic acid (9.334 mmol) were stirred for 48 hours to prepare the polybenzimidazole copolymer 5 in Example 1.

Comparative Example 2

Preparation of polybenzimidazole copolymer [Poly(2,5-benzimidazole)] (6)

This was repeated in the same manner as in Example 1, except that 80 g of polyphosphoric acid, and 4.000 g of 3,4-diaminobenzoic acid (16.290 mmol) were stirred for 24 hours to prepare a polybenzimidazole copolymer 6 in the Example 1.

Comparative Examples 3 and 4

Preparation of Electrolyte Membrane Specimen

This was repeated in the same manner as in Example 5, except that the copolymers 5 and 6 prepared in Comparative examples 1 and 2 were used to prepare electrolyte membrane specimens 5 and 6 in Example 5.

Comparative Examples 5 and 6

Preparation of Consistent Electrolyte Paste/Gel

This was repeated in the same manner as in Example 9, except that copolymers 5 and 6 prepared in Comparative examples 1 and 2 were used to prepare consistent electrolyte paste/gels 5 and 6 in Example 9.

Comparative Examples 7 and 8

Preparation of Membrane-Electrode Assembly from Electrolyte Membrane

This was repeated in the same manner as in Example 13, except that the electrolyte membrane specimens 5 to 6 prepared in Comparative examples 3 and 4, and the electrolyte membrane specimens 5 to 6 prepared in Comparative examples 5 and 6 were used to prepare the consistent membrane-electrode assemblies in Example 13.

The physical properties of the electrolyte membrane specimens prepared according to the Examples and Comparative examples, and the fuel cell performances of the membrane-electrode assemblies were measured according to the following method, and the results are listed in the following Table 1.

Measurement of hydrogen ion conductivity—The hydrogen ion conductivity was measured in the temperature range from −20 to 200° C. under moisture-free conditions with a Potentio-Static Two-Probe method at a frequency of 1 Hz-1 MHz using a ZAHNER IM-6 Impedance Analyzer, and the results are shown in FIG. 1. The results measuring the hydrogen-ion conductivity at 140° C. under moisture-free conditions according to the time are shown in FIG. 2.

Measurement of Mechanical Strength—This was measured with a Zwick UTM, and each of the electrolyte membrane specimens were formed at room temperature and a humidity of 25% into dog-boned films that satisfy an ASTM D-882 (Standard Test Method for Tensile Properties of Thin Plastic Sheeting), and then each measured five times at a crosshead speed of 50 mm/min to calculate the mean value of the measured tensile strengths, and the results are listed in the following Table 1.

Measurement of Phosphoric Acid Doping Level—The acid doping level was measured using a neutralization titration. Approximately 1 g of the prepared electrolyte membrane was boiled in distilled water (300 mL) to extract the doped phosphoric acid, and then the extracted phosphoric acid was titrated with a standard 0.1 N NaOH solution to calculate the moles of phosphoric acid. The electrolyte membrane devoid of phosphoric acid was dried at 120° C. for at least 24 hours in a vacuum oven, and the electrolyte membranes were weighed. The amount of the doped phosphoric acid per imidazole unit constituting the polymer, that is, a doping level was calculated according to the following Equation 1, and the results are listed in the following Table 1.

$$\text{Phosphorous Doping Level} = \frac{\text{Mole Number of Doped Phosphorous}}{\frac{\text{Weight of Dried Electrolyte Membrane}}{\text{MW per Polymer repeating Unit}} \times \frac{\text{Number of Imidazole per Polymer Repeating Unit}}}$$

[Math Figure 1]

Wherein, the mole number of the doped phosphoric acid represents 0.1 N NaOH used for titration.

Evaluation of Fuel Cell Performance—The prepared membrane-electrode assemblies were assembled into a single cell and operated, and the cell temperature ranged from 120° C. to 200° C., and the flow rates of $H_2$ and air were 300 sccm and 1200 ccm, respectively. There was no outer humidifying apparatus, the fuel cell performance was measured under atmospheric pressure, and the results are shown in FIG. 3. As shown in FIG. 4, it was revealed that the cell temperature is 160° C., and the voltage reduced at a constant current (300 mA/$Cm^2$) with the time. OCV (Open Circuit Voltage) has a value of at least 0.95 V, and the cell was operated for a predetermined time at a constant voltage mode to secure a stable current density.

TABLE 1

| Electrolyte membrane | Phosphorous doping level | Apparent physical property | Stress at break (MPa) | Strain (%) |
|---|---|---|---|---|
| Specimen 1 | 3.4 | Clear, Excellent mechanical strength | 24.1 | 160 |
| Specimen 2 | 4.6 | Clear, Excellent mechanical strength | 26.7 | 180 |
| Specimen 3 | 3.2 | Clear, Excellent mechanical strength | 24.8 | 182 |
| Specimen 4 | 3.9 | Clear, Good mechanical strength | 21.5 | 140 |
| Specimen 5 | 5.4 | Clear, Good mechanical strength | 16.8 | 220 |
| Specimen 6 | 5.1 | Clear, Good mechanical strength | 13.4 | 260 |

From the said Table 1, it was revealed that the branched multiblock polybenzimidazole-benzamide copolymer electrolyte membranes of Examples 5 to 8 prepared according to the present invention had a low phosphoric acid doping level, and the same or more effects on the apparent physical properties, the stress and the strain, compared to that of the conventional polyazole-based copolymer electrolyte membrane of Comparative examples 3 and 4. From FIG. 1, it was revealed that its hydrogen ion conductivity was improved. And from FIG. 2, it was revealed that its conductivity was not reduced with time, but was maintained constantly.

From FIG. 3 showing the PEM fuel cell performance according to the driving temperature in the branched multiblock polybenzimidazole-benzamide copolymer electrolyte membrane (specimen 2) of Example 6 prepared according to the present invention, it was also revealed that the electrolyte membrane prepared according to the present invention exhibited a good performance of 400 mA/$cm^2$ at a temperature of 180° C. and a voltage of 0.6 V. From FIG. 4, showing a change of the PEM fuel cell performance according to the time in the electrolyte membrane (specimen 2) at 160° C. and 300 mA/$cm^2$, it was also revealed that the performance of the fuel cell did not deteriorate with time, but was maintained constantly.

INDUSTRIAL APPLICABILITY

As described above, the electrolyte membrane prepared from the branched multiblock polybenzimidazole-benzamide copolymer of the present invention has advantages in that it has high hydrogen ion conductivity over a wide temperature range, as well as excellent physical properties such as mechanical properties, chemical resistance and thermal stability. Deterioration of the membrane properties is effectively controlled by phosphoric acid doping and high hydrogen ion conductivity is realized even with a low phosphoric acid doping level. The consistent electrolyte paste/gel prepared from the branched multiblock polybenzimidazole-benzamide copolymer of the present invention may be useful to coat an electrode uniformly, and may be useful in providing a fuel cell having improved operating performance by coating the electrolyte membrane and the consistent electrolyte paste/gel in the fuel cell, since it can uniformly coat the electrode.

As described above, the present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention claimed is:

1. A branched multiblock polybenzimidazole-benzamide copolymer consisting of a repeating unit represented by the following Formula 1:

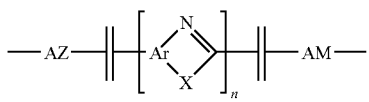
[Formula 1]

wherein,

AZ represents at least one repeating unit selected from the group consisting of Formulas 2 and 3;

AM represents at least one repeating unit selected from the group consisting of Formulas 4, 5, 6 and 7:

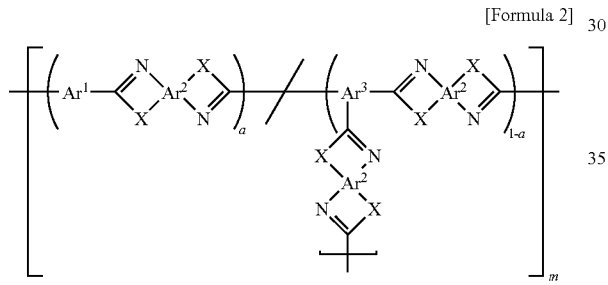
[Formula 2]

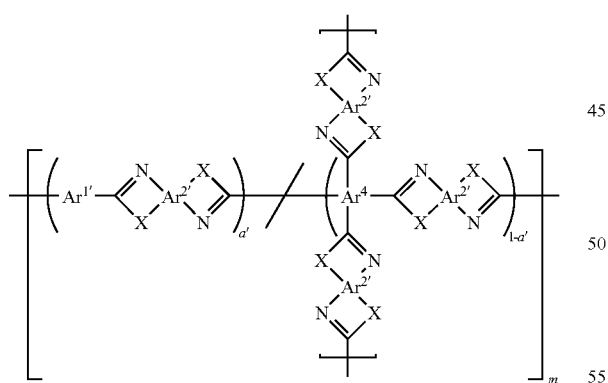
[Formula 3]

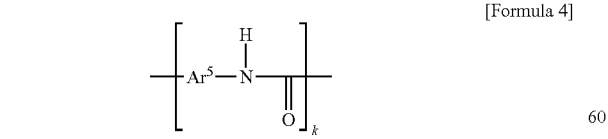
[Formula 4]

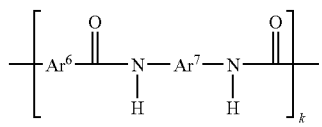
[Formula 5]

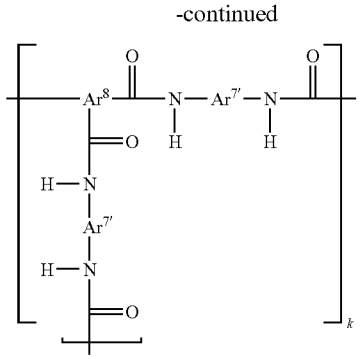
[Formula 6]

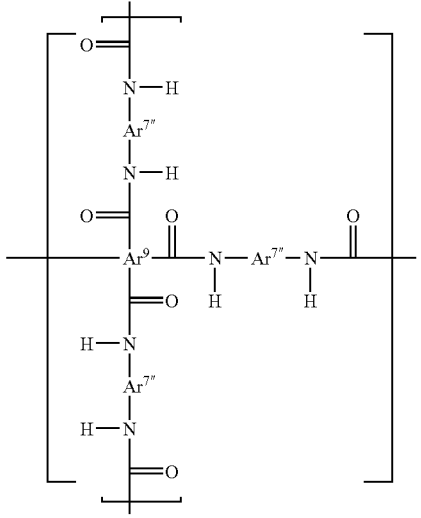
[Formula 7]

wherein,

Ar, $Ar^2$, $Ar^{2'}$ and $Ar^9$ are independently identical or different to each other, each representing a tetravalent aromatic or heteroaromatic group having at least one ring;

$Ar^1$, $Ar^{1'}$, $Ar^5$, $Ar^6$, $Ar^7$ and $Ar^{7''}$ are independently identical or different to each other, each representing a divalent aromatic or heteroaromatic group having at least one ring;

$Ar^3$, $Ar^{4'}$ and $Ar^8$ are independently identical or different to each other, each representing a trivalent aromatic or heteroaromatic group having at least one ring;

X is identical or different to each other, each representing a group having an oxygen, sulfur or hydrogen atom, a group having 1 to 20 carbon atoms, or an aryl group;

$0<a<1$, and $0<a'<1$; and $1 \leq m<10,000$, $1 \leq n<10,000$, and $1 \leq k<10,000$.

2. A method for preparing the multiblock polybenzimidazole-benzamide copolymer as defined in claim 1, wherein a compound is dissolved in polyphosphoric acid in the presence of inert gas and polymerized at a temperature of 300° C. or less, the compound being selected from the group consisting of:

at least one compound selected from the group consisting of the aromatic and heteroaromatic tetraamino compounds;

at least one compound selected from the group consisting of aromatic and heteroaromatic carboxylic acids having at least two acid groups per carboxylic acid monomer; and their esters;

at least one compound selected from the group consisting of aromatic and heteroaromatic diaminocarboxylic acids;

at least one compound selected from the group consisting of aromatic and heteroaromatic aminocarboxylic acids and aromatic and heteroaromatic diamino compounds; and at least one compound selected from the group consisting of aromatic and heteroaromatic tricarboxylic acids and tetracarboxylic acids.

3. The method for preparing the multiblock polybenzimidazole-benzamide copolymer according to claim 2, comprising the steps of:

(a) firstly preparing an azole-based AZ block using at least one compound as a branching agent in addition to the aromatic and heteroaromatic tetraamino compounds and the aromatic and heteroaromatic carboxylic acids, wherein the compound is selected from the group consisting of aromatic and heteroaromatic tricarboxylic acids and tetracarboxylic acids, and the branching agent has a content of 0.01 to 30 mol % on the basis of the total content of the tetraamino compound used for preparing the branched AZ block;

(b) preparing a copolymer

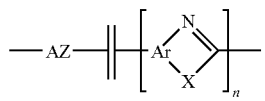

in which the branched AZ block and a

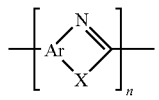

block are chemically combined alternately using 0.01 to 99.99 mol % of the aromatic and heteroaromatic diaminocarboxylic acid on the basis of the content of the tetraamino compound constituting the AZ block after dissolving a compound constituting the AZ block in polyphosphoric acid in the presence of inert gas and stirring the resultant mixture at 300° C. or less for 8 hours or less; and (c) preparing a branched multiblock copolymer consisting of a repeating unit represented in Formula 1 using 0.01 to 49.99 mol % of at least one compound selected from the group consisting of aromatic and heteroaromatic aminocarboxylic acids and aromatic and heteroaromatic diamino compounds; at least one compound selected from the group consisting of aromatic and heteroaromatic carboxylic acids; and aromatic and heteroaromatic tricarboxylic acids and tetracarboxylic acids, etc, on the basis of the content of the tetraamino compound constituting the AZ block, after adding the aromatic and heteroaromatic diaminocarboxylic acid to the copolymer solution and stirring the resultant mixture for 48 hours or less.

4. The method for preparing the multiblock polybenzimidazole-benzamide copolymer according to claim 2, comprising the steps of:

(a') firstly preparing a

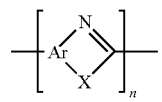

block by dissolving an aromatic and heteroaromatic diaminocarboxylic acid in polyphosphoric acid in the presence of inert gas and stirring the resultant mixture at 300° C. or less for 8 hours or less;

(b') preparing a multiblock copolymer consisting of a repeating unit

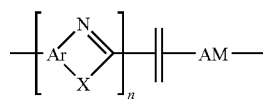

by stirring, at 220° C. or less for 48 hours or less, 0.01 to 99.99 mol % of at least one compound selected from the group consisting of aromatic and heteroaromatic aminocarboxylic acids and aromatic and heteroaromatic diamino compounds; at least one compound selected from the group consisting of aromatic and heteroaromatic carboxylic acids; and aromatic and heteroaromatic tricarboxylic acids and tetracarboxylic acids, etc. on the basis of the content of the tetraamino compound constituting the AZ block on the basis of the content of the aromatic and heteroaromatic diaminocarboxylic acid compound constituting a

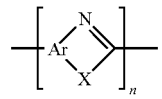

block; and (c') preparing a branched multiblock copolymer consisting of a repeating unit represented by Formula 1 by stirring the multiblock copolymer at 220° C. or less for 48 hours or less, using the aromatic and heteroaromatic tricarboxylic acid and tetracarboxylic acid as a branching agent in addition to the aromatic and heteroaromatic tetraamino compound and the aromatic and heteroaromatic carboxylic acid, wherein the branching agent has a content of 10 to 1000 mol % on the basis of the total content of the aromatic and heteroaromatic diaminocarboxylic acid compound constituting a

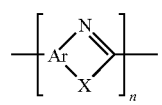

block.

5. The method for preparing the multiblock polybenzimidazole-benzamide copolymer according to claim 2, wherein the aromatic and heteroaromatic tetraamino compound is selected from the group consisting of 3,3',4,4'-tetraaminobiphenyl, 2,3,5,6-tetraaminopyridin, 1,2,4,5-tetraaminobenzene, bis(3,4-diaminophenyl)sulfone, bis(3,4-diaminophenyl)ether, 3,3',4,4'-tetraaminobenzophenone, 3,3',4,4'-tetraaminodiphenylmethane and 3,3',4,4'-tetraaminodiphenyldimethylmethane, and salts thereof, and mono-, di-, tri- and tetrahydrochloride derivatives thereof.

6. The method for preparing the multiblock polybenzimidazole-benzamide copolymer according to claim 2, wherein the aromatic carboxylic acid is selected from the group consisting of aromatic dicarboxylic acids selected from the group consisting of 2,3-bis(4-carboxylphenyl)quinoxalin, 1,4-phenylene-bis-[3-(4'- carboxylphenyl)thiourea], p-phenylene-2,2'-bis[5(6)-carboxylbenzimidazole], bis(4-carboxylphenyl) phosphinic acid, bis(4-carboxylphenyl)phenylmethanol, bis(4-carboxylphenyl)phenylphosphine oxide, 5-phosphinoisophthalic acid, isophthalic acid, terephthalic acid, phthalic acid, 5-hydroxyisophthalic acid, 4-hydroxyisophthalic acid, 2-hydroxyisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl)ether, benzophenone-4,4'-dicarboxylic acid, bis(4-carboxyphenyl)sulfone, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid; $C_1$-$C_{20}$-alkyl esters or $C_5$-$C_{12}$-aryl esters thereof; acid anhydrides thereof; and acid chlorides thereof.

7. The method for preparing the multiblock polybenzimidazole-benzamide copolymer according to claim 2, wherein the heteroaromatic carboxylic acid is selected from the group consisting of pyridin-2,5-dicarboxylic acid, pyridin-3,5-dicarboxylic acid, pyridin-2,6-dicarboxylic acid, pyridin-2,4-dicarboxylic acid, 4-phenyl-2,5-pyridindicarboxylic acid, 3,5-pyrazoldicarboxylic acid, 2,6-pyrimidinedicarboxylic acid, 2,5-pyrimidinedicarboxylic acid, benzimidazole-5,6-dicarboxylic acid; $C_1$-$C_{20}$-alkyl esters or $C_5$-$C_{12}$-aryl esters thereof; acid anhydrides thereof; and acid chlorides thereof.

8. The method for preparing the multiblock polybenzimidazole-benzamide copolymer according to claim 2, wherein the aromatic tricarboxylic acids used as the branching agent; the $C_1$-$C_{20}$-alkyl esters or $C_5$-$C_{12}$-aryl esters thereof; the acid anhydrides thereof and the acid chlorides thereof are selected from the group consisting of 1,3,5-benzenetricarboxylic acid (trimesic acid), 1,2,4-benzenetricarboxylic acid(trimellitic acid), 3,5,3'-biphenyltricarboxylic acid, and 3,5,4'-biphenyltricarboxylic acid;

the aromatic tetracarboxylic acids or tetracarboxylic acids used as the branching agent; the $C_1$-$C_{20}$-alkyl esters or $C_5$-$C_{12}$-aryl esters thereof; the acid anhydrides thereof and the acid chlorides thereof is selected from the group consisting of 3,5,3',5' biphenyltetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, and 1,4,5,8-naphthalenetetracarboxylic acid; and the heteroaromatic tricarboxylic acids and tetracarboxylic acids used as the branching agent; the $C_1$-$C_{20}$-alkyl esters or $C_5$-$C_{12}$-aryl esters thereof; and the acid anhydrides thereof is 2,4,6-pyridintricarboxylic acid.

9. The method for preparing the multiblock polybenzimidazole-benzamide copolymer according to claim 2, wherein the aromatic and heteroaromatic diaminocarboxylic acids are selected from the group consisting of 3,4-diaminobenzoic acid, and mono- and dihydrochloride derivatives thereof.

10. The method for preparing the multiblock polybenzimidazole-benzamide copolymer according to claim 2, wherein the aromatic and heteroaromatic aminocarboxylic acids are selected from the group consisting of 4-aminobenzoic acid, 3-aminobenzoic acid, 4-amino-2-sulfobenzoic acid, 4-amino-3-sulfobenzoic acid, 4-amino-2-sulfobenzoic acid, 2-aminopyrimidine-5-carboxylic acid, 6-aminopyridin-3-carboxylic acid, 5-aminopyridin-2-carboxylic acid, 5-aminopyrazine-2-carboxylic acid, 5-aminopyrimidine-2-carboxylic acid, 2-(phenyl)-p-aminobenzoic acid, and 3-(phenyl)-p-aminobenzoic acid.

11. The method for preparing the multiblock polybenzimidazole-benzamide copolymer according to claim 2, wherein the aromatic and heteroaromatic diamino compounds are selected from the group consisting of benzene-1,4-diamine, 2,5-diaminobenzenesulfonic acid, pyrazine-2,5-diamine, pyridin-2,5-diamine, 2-(phenyl)benzene-1,4-diamine, pyrimidine-2,5-diamine, 2-(pyridin-3-yl)benzene-1,4-diamine, 2-(pyridin-2-yl)benzene-1,4-diamine, 2-(pyridin-2-yl)benzene-1,4-diamine, 2-(pyridin-5-yl)benzene-1,4-diamine, 4,4'-diaminobiphenyl, 3,3'-diaminobiphenyl, 3,4'-diaminobiphenyl, 5-amino-2-(p-aminophenyl)benzenesulfonic acid, 2-amino-5-(p-aminophenyl)benzenesulfonic acid, and 4,4'-diamino-2-phenylbiphenyl.

12. The method for preparing the multiblock polybenzimidazole-benzamide copolymer according to claim 2, wherein the branched multiblock polybenzimidazole-benzamide copolymer has at least 10 repeating units of the azole-based AZ, and at least one repeating unit of the amide-based AM.

13. The method for preparing the multiblock polybenzimidazole-benzamide copolymer according to claim 1, wherein the branched multiblock polybenzimidazole-benzamide copolymer is a compound represented by the following Formula 8 comprising a repeating unit of benzimidazole-benzamide:

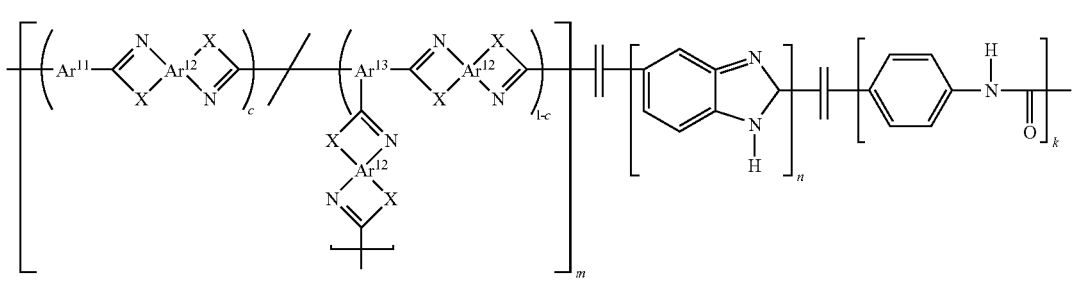

[Formula 8]

wherein,

Ar$^{11}$ is selected from the group consisting of

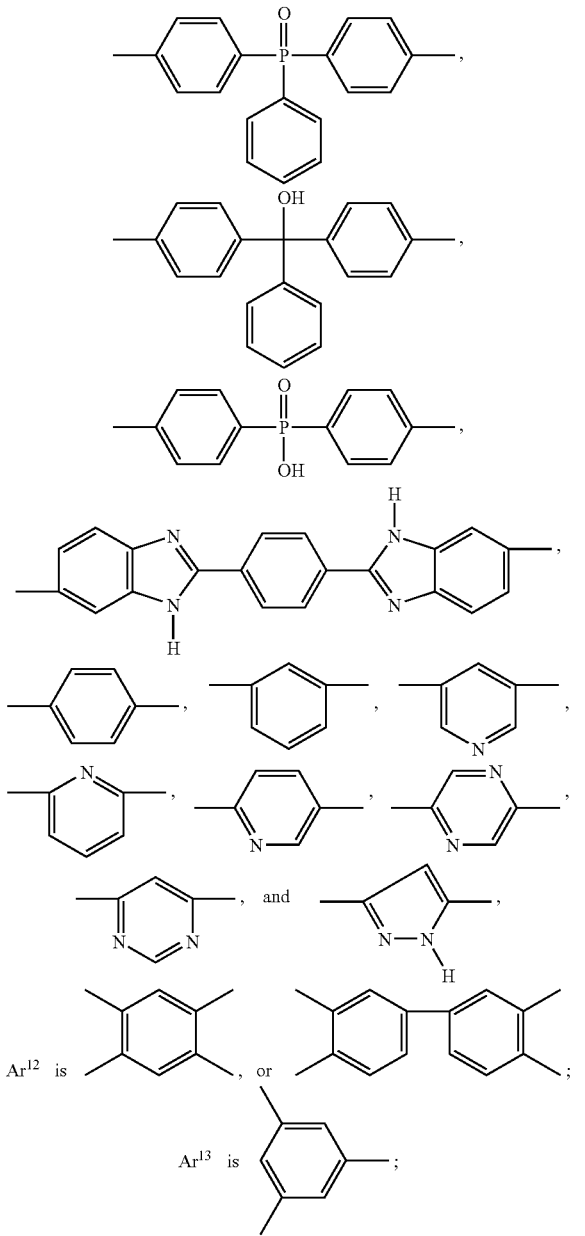

$0 < c < 1$; and $1 \leq m < 10,000$, $1 \leq n < 10,000$, and $1 \leq k < 10,000$.

14. A multiblock polybenzimidazole-benzamide copolymer electrolyte membrane prepared from the multiblock polybenzimidazole-benzamide copolymer as defined in claim 1.

15. A method for preparing a multiblock polybenzimidazole-benzamide copolymer electrolyte membrane, wherein the copolymer electrolyte membrane is prepared by directly coating the polyphosphoric acid-containing multiblock polybenzimidazole-benzamide copolymer solution as defined in claim 1 on a support, followed by inducing hydrolysis of a polyphosphoric acid solvent until a membrane is formed from the coated solution.

16. A consistent electrolyte paste/gel of multiblock polybenzimidazole-benzamide copolymer prepared from the multiblock polybenzimidazole-benzamide copolymer solution as defined in claim 1.

17. A method for preparing a consistent electrolyte paste/gel of multiblock polybenzimidazole-benzamide copolymer, wherein the copolymer is prepared by adding a small amount of the remaining water to the polyphosphoric acid-containing multiblock polybenzimidazole-benzamide copolymer solution as defined in claim 1 and stirring the resultant mixture to remove water while inducing hydrolysis of a polyphosphoric acid.

18. The consistent electrolyte paste/gel of multiblock polybenzimidazole-benzamide copolymer according to claim 16 or 17, comprising a 50 to 200% by weight of the phosphoric acid.

19. A membrane-electrode assembly prepared from a multiblock polybenzimidazole-benzamide copolymer electrolyte membrane prepared from a branched multiblock polybenzimidazole-benzamide copolymer consisting of a repeating unit represented by the following Formula 1:

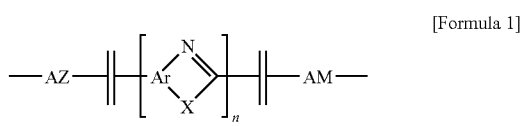

[Formula 1]

wherein

AZ represents at least one repeating unit selected from the group consisting of Formulas 2 and 3

AM represents at least one repeating unit selected from the group consisting of Formulas 4, 5, 6 and 7:

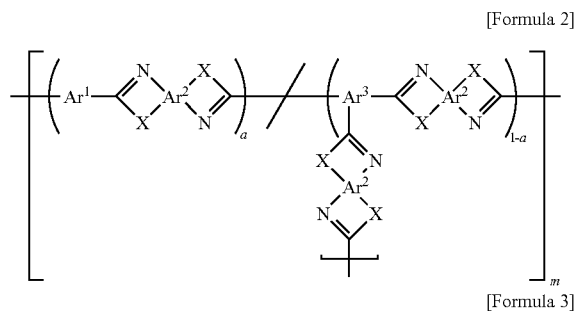

[Formula 2]

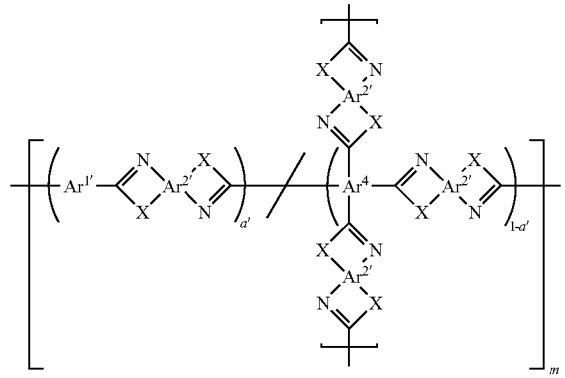

[Formula 3]

-continued

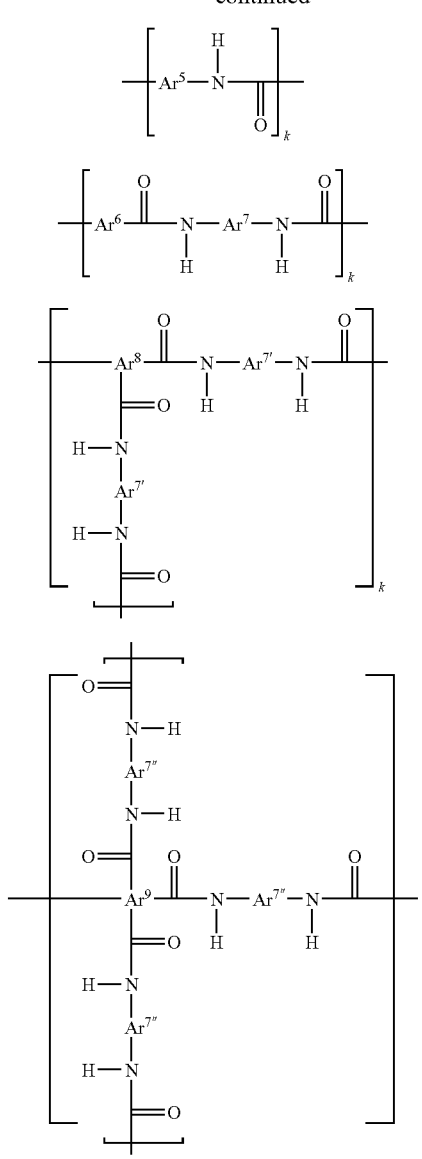

[Formula 4]

[Formula 5]

[Formula 6]

[Formula 7]

wherein,

Ar, $Ar^2$, $Ar^{2'}$ and $Ar^9$ are independently identical or different to each other, each representing a tetravalent aromatic or heteroaromatic group having at least one ring;

$Ar^1$, $Ar^{1'}$, $Ar^5$, $Ar^6$, $Ar^7$ and $Ar^{7''}$ are independently identical or different to each other, each representing a divalent aromatic or heteroaromatic group having at least one ring;

$Ar^3$, $Ar^{4'}$ and $Ar^8$ are independently identical or different to each other, each representing a trivalent aromatic or heteroaromatic group having at least one ring;

X is identical or different to each other, each representing a group having an oxygen, sulfur or hydrogen atom, a group having 1 to 20 carbon atoms, or an aryl group;

$0 < a < 1$, and $0 < a' < 1$; and $1 \leq m < 10{,}000$, $1 \leq n < 10{,}000$, and $1 \leq k < 10{,}000$ and the consistent electrolyte paste/gel of multiblock polybenzimidazole-benzamide copolymer as defined in claim 16.

20. A method for preparing a membrane-electrode assembly, comprising a step of coating an electrode containing the consistent electrolyte paste/gel of multiblock polybenzimidazole-benzamide copolymer as defined in claim 16 and a noble metal-based catalyst on a multiblock polybenzimidazole-benzamide copolymer electrolyte membrane prepared from a branched multiblock polybenzimidazole-benzamide copolymer consisting of a repeating unit represented by the following Formula 1:

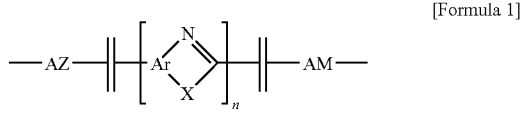

[Formula 1]

wherein

AZ represents at least one repeating unit selected from the group consisting of Formulas 2 and 3

AM represents at least one repeating unit selected from the group consisting of Formulas 4, 5, 6 and 7:

[Formula 2]

[Formula 3]

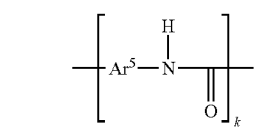

[Formula 4]

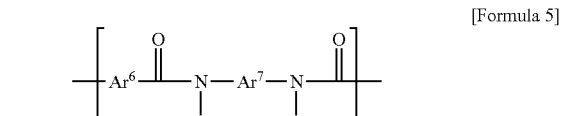

[Formula 5]

-continued

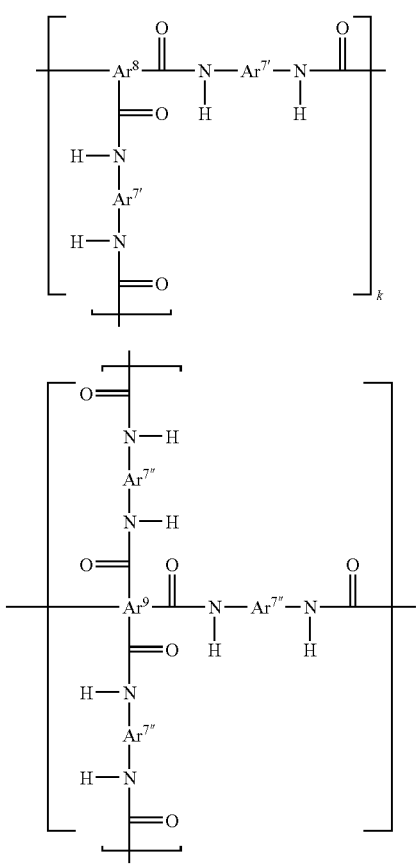

[Formula 6]

[Formula 7]

wherein

Ar, $Ar^2$, $Ar^{2'}$ and $Ar^9$ are independently identical or different to each other, each representing a tetravalent aromatic or heteroaromatic group having at least one ring;

$Ar^1$, $Ar^{1'}$, $Ar^5$, $Ar^6$, $Ar^7$ and $Ar^{7''}$ are independently identical or different to each other, each representing a divalent aromatic or heteroaromatic group having at least one ring;

$Ar^3$, $Ar^{4'}$ and $Ar^8$ are independently identical or different to each other, each representing a trivalent aromatic or heteroaromatic group having at least one ring;

X is identical or different to each other, each representing a group having an oxygen, sulfur or hydrogen atom, a group having 1 to 20 carbon atoms, or an aryl group;

$0<a<1$, and $0<a'<1$; and
$1 \leq m < 10,000$, $1 \leq n < 10,000$, and $1 \leq k < 10,000$.

21. A fuel cell prepared from the membrane-electrode assembly as defined in claim 19.

* * * * *